(12) United States Patent
Voytovych et al.

(10) Patent No.: US 11,988,140 B2
(45) Date of Patent: May 21, 2024

(54) GAS TURBINE ENGINE INLET WALL DESIGN

(71) Applicant: Raytheon Technologies Corporation, Farmington, CT (US)

(72) Inventors: Dmytro Mykolayovych Voytovych, Rocky Hill, CT (US); Om P. Sharma, South Windsor, CT (US)

(73) Assignee: RTX Corporation, Farmington, CT (US)

( * ) Notice: Subject to any disclaimer, the term of this patent is extended or adjusted under 35 U.S.C. 154(b) by 568 days.

(21) Appl. No.: 17/147,129

(22) Filed: Jan. 12, 2021

(65) Prior Publication Data

US 2021/0388761 A1    Dec. 16, 2021

Related U.S. Application Data

(62) Division of application No. 14/665,081, filed on Mar. 23, 2015, now Pat. No. 10,907,544.

(60) Provisional application No. 61/971,037, filed on Mar. 27, 2014.

(51) Int. Cl.
| | |
|---|---|
| *F02C 7/04* | (2006.01) |
| *B64C 39/10* | (2006.01) |
| *B64D 27/00* | (2006.01) |
| *B64D 27/14* | (2006.01) |
| *B64D 33/02* | (2006.01) |
| *F01D 5/02* | (2006.01) |

(52) U.S. Cl.
CPC ............... *F02C 7/04* (2013.01); *B64D 27/00* (2013.01); *B64D 27/14* (2013.01); *B64D 33/02* (2013.01); *F01D 5/02* (2013.01); *B64C 2039/105* (2013.01); *B64D 2033/0253* (2013.01); *F05D 2250/14* (2013.01); *F05D 2250/312* (2013.01); *Y02T 50/10* (2013.01)

(58) Field of Classification Search
CPC ..... B64D 33/02; B64C 2039/105; F02C 7/04; F02K 3/12
See application file for complete search history.

(56) References Cited

U.S. PATENT DOCUMENTS

| | | | |
|---|---|---|---|
| 3,583,661 | A | 6/1971 | Stake et al. |
| 5,114,097 | A | 5/1992 | Williams |
| 5,893,535 | A | 4/1999 | Hawley |
| 6,089,504 | A | 7/2000 | Williams et al. |
| 6,527,224 | B2 | 3/2003 | Seidel |
| 7,644,888 | B2 | 1/2010 | Eakins et al. |
| 7,665,689 | B2 | 2/2010 | McComb |

(Continued)

*Primary Examiner* — Nicholas McFall
*Assistant Examiner* — Eric Acosta
(74) *Attorney, Agent, or Firm* — Carlson, Gaskey & Olds, P.C.

(57) ABSTRACT

A blended wing aircraft including a blended wing fuselage and at least one embedded gas turbine engine in the fuselage. The gas turbine engine includes an inlet duct formed with a generally elliptical shape that includes a first set of ellipse sections along an upper portion of the inlet duct and a second set of ellipse sections along a lower portion of the inlet duct. The inlet duct includes a vertical centerline. The first set of ellipse sections at a throat of the inlet duct is larger in area than an area of an upstream most end of the second set of ellipse sections. The area of the second set of ellipse sections increases toward a downstream end of the inlet duct. A fan section has an axis of rotation that is spaced from the vertical centerline and is disposed within an inlet duct orifice. The inlet duct is upstream of the fan section.

14 Claims, 4 Drawing Sheets

(56) References Cited

U.S. PATENT DOCUMENTS

| | | |
|---|---|---|
| 7,861,968 B2 | 1/2011 | Parikh et al. |
| 8,056,852 B1 | 11/2011 | Dizdarevic et al. |
| 8,210,474 B2 | 7/2012 | Dyer et al. |
| 8,302,908 B1 | 11/2012 | Kismarton et al. |
| 8,366,050 B2 | 2/2013 | Odle et al. |
| 2006/0185346 A1 | 8/2006 | Rolt |
| 2012/0025006 A1 | 2/2012 | Luther |
| 2014/0083518 A1 | 3/2014 | Whitmore |
| 2015/0122952 A1 | 5/2015 | Florea |
| 2016/0009402 A1 | 1/2016 | Hunter |

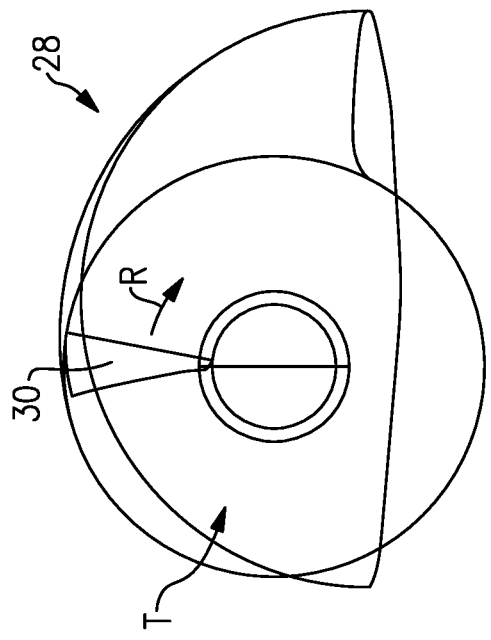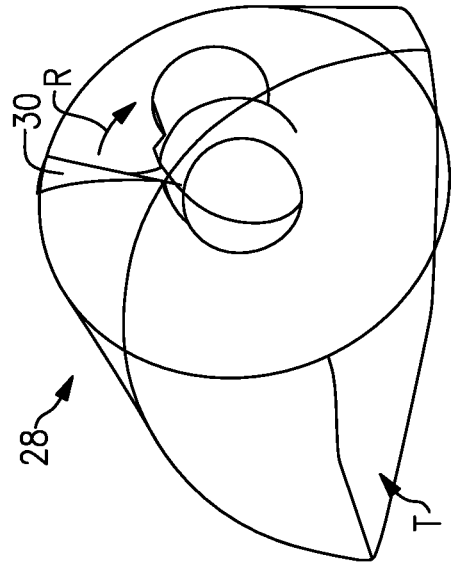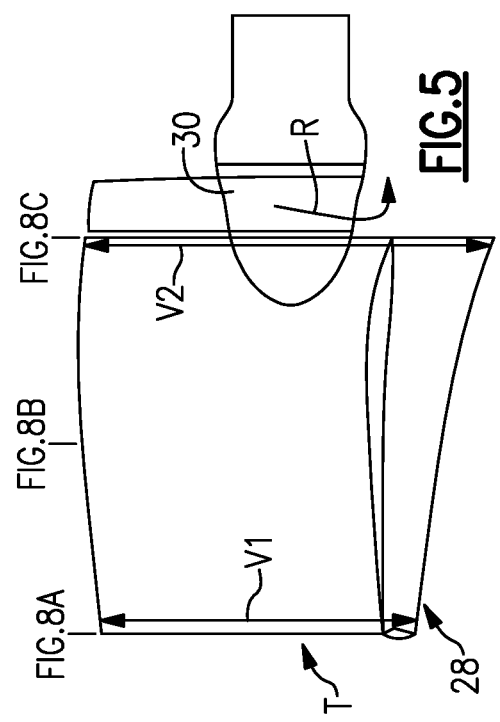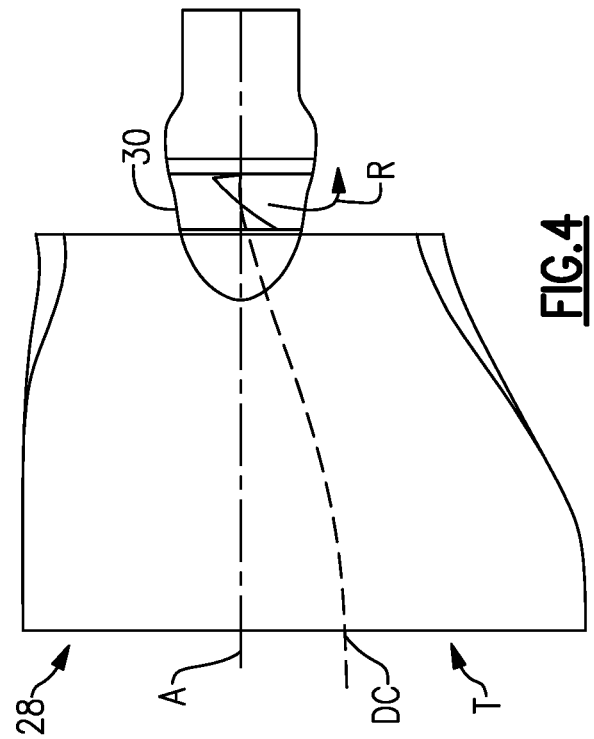
FIG.6
FIG.7
FIG.5
FIG.4

GAS TURBINE ENGINE INLET WALL DESIGN

CROSS-REFERENCE TO RELATED APPLICATIONS

This application is a divisional of U.S. application Ser. No. 14/665,081, which was filed on Mar. 23, 2015 and claims priority to U.S. Provisional Application No. 61/971,037, which was filed on Mar. 27, 2014 and is incorporated herein by reference.

STATEMENT REGARDING FEDERALLY SPONSORED RESEARCH OR DEVELOPMENT

This invention was made with government support under Contract No. NNC07CB59C, awarded by NASA. The Government has certain rights in this invention.

BACKGROUND

This application relates to an inlet wall design for use in an embedded gas turbine engine.

Gas turbine engines are known and typically include a fan delivering air into a bypass duct and into a core engine. In the core engine the air is compressed at a compressor and then mixed with fuel and ignited in a combustion section. Products of the combustion pass downstream over turbine rotors, driving them to rotate.

Gas turbine engines have historically been mounted on a tail or beneath the wings of an aircraft. However, a next generation of aircraft seeks to dramatically increase fuel efficiency, reduce emissions, and decrease fuel burn. A design for such aircraft utilizes a blended wing design wherein the body and wing merge smoothly into each other. Such designs have typically been proposed with embedded engines, which are mounted within a fuselage or body of the aircraft.

In such an engine, the area upstream of an inlet to the engine is different on circumferential locations adjacent to the body than at locations spaced away from the body. A boundary layer or area of low momentum air will be formed leading into the inlet and the fan at circumferential locations associated with the body.

SUMMARY

In one exemplary embodiment, a gas turbine engine includes an inlet duct that is formed with a generally elliptical shape. The inlet duct includes a vertical centerline and a fan section that has an axis of rotation. The axis of rotation is spaced from the vertical centerline and is disposed within an inlet duct orifice.

In a further embodiment of the above, the axis of rotation is spaced a first distance from the vertical centerline at a throat of the inlet duct. The axis of rotation is spaced a second distance from the vertical centerline at an intermediate location along the inlet duct. The first distance is greater than the second distance.

In a further embodiment of any of the above, the axis of rotation is spaced a third distance from the vertical centerline at an axial location adjacent the fan section. The third distance is less than the second distance.

In a further embodiment of any of the above, the axis of rotation is spaced a first distance from the vertical centerline at a first axial position in the inlet duct. The axis of rotation is spaced a second distance from the vertical centerline at a second axial position in the inlet duct. The first distance is greater than the second distance.

In a further embodiment of any of the above, the first axial position is upstream of the second axial position.

In a further embodiment of any of the above, the axis of rotation is spaced from the vertical centerline in a direction of rotation of an upper fan blade of the fan section.

In another exemplary embodiment, a blended wing aircraft includes a blended wing fuselage and at least one embedded gas turbine engine in the fuselage. The gas turbine engine includes an inlet duct formed with a generally elliptical shape with a vertical centerline and a fan section that has an axis of rotation. The axis of rotation is spaced from the vertical centerline.

In a further embodiment of the above, the axis of rotation is spaced a first distance from the vertical centerline at a throat of the inlet duct. The axis of rotation is spaced a second distance from the vertical centerline at an intermediate location along the inlet duct. The first distance is greater than the second distance.

In a further embodiment of the above, the axis of rotation is spaced a third distance from the vertical centerline at an axial location adjacent the fan section. The third distance is less than the second distance.

In a further embodiment of the above, the axis of rotation is spaced a first distance from the vertical centerline at a first axial position in the inlet duct. The axis of rotation is spaced a second distance from the vertical centerline at a second axial position in the inlet duct. The first distance is greater than the second distance.

In a further embodiment of the above, the first axial position is upstream of the second axial position.

In a further embodiment of the above, the axis of rotation is spaced from the vertical centerline in a direction of rotation of an upper fan blade of the fan section.

In a further embodiment of the above, the axis of rotation is disposed within an inlet duct orifice.

In a further embodiment of the above, the at least one embedded gas turbine engine includes a first gas turbine engine that is configured to rotate in a first direction. A second gas turbine engine is configured to rotate in a second opposite direction.

BRIEF DESCRIPTION OF THE DRAWINGS

FIG. 4 illustrates a top view of the inlet duct.

FIG. 5 illustrates a side view of the inlet duct.

FIG. 6 illustrates a perspective view of the inlet duct.

FIG. 7 illustrates a perspective view of the inlet duct.

DETAILED DESCRIPTION

Figure 1:
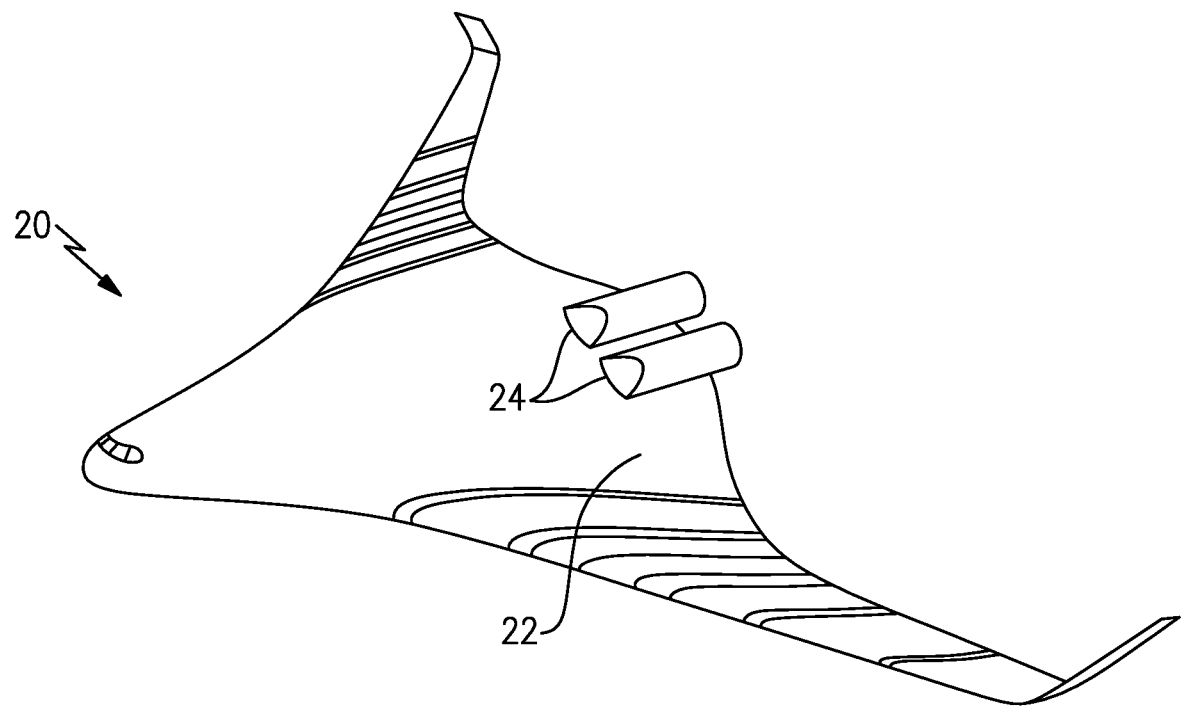
FIG. 1 illustrates a blended wing aircraft.

An aircraft 20 is illustrated in FIG. 1 having a blended wing body or fuselage 22 and a plurality of embedded gas turbine engines 24. As known, the embedded gas turbine engines 24 include a fan 30 (FIG. 2) at an upstream location delivering air into a compressor and into a bypass duct. The air is mixed with fuel and ignited in a combustor downstream of the compressor and products of that combustion pass downstream over turbine rotors driving them to rotate.

Figure 2:
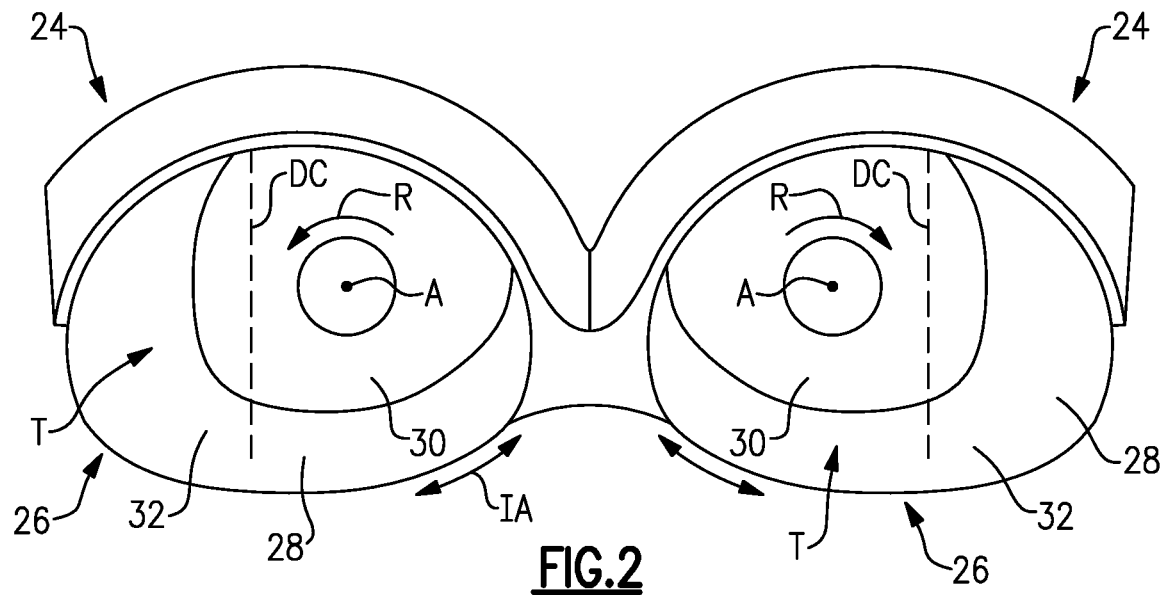
FIG. 2 illustrates an inlet duct for a gas turbine engine as may be included in the FIG. 1 embodiment.

There are challenges with regard to the embedded gas turbine engines 24. As an example, as shown in FIG. 2, an inlet end 26 of the embedded gas turbine engine 24 includes an inlet duct 28 that will sit on the fuselage 22. There will be a boundary layer leading into a bottom surface 32 of the inlet duct 28 for the gas turbine engine 24. A duct centerline DC of the inlet duct 28 is shifted horizontally from an axis of rotation A of the fan 30. For example, the duct centerline DC is shifted horizontally in the direction of rotation R of a fan blade located at a top of the fan 30. As shown in this design, the inlet duct 28 includes a throat T at the inlet end 26 that is generally elliptical. The inlet duct 28 becomes generally more circular downstream of the throat T towards the fan 30. Applicant has designed the shape of the inlet duct by utilizing ellipses and optimizing the curves, lengths and shape of the overall duct.

Figure 3:
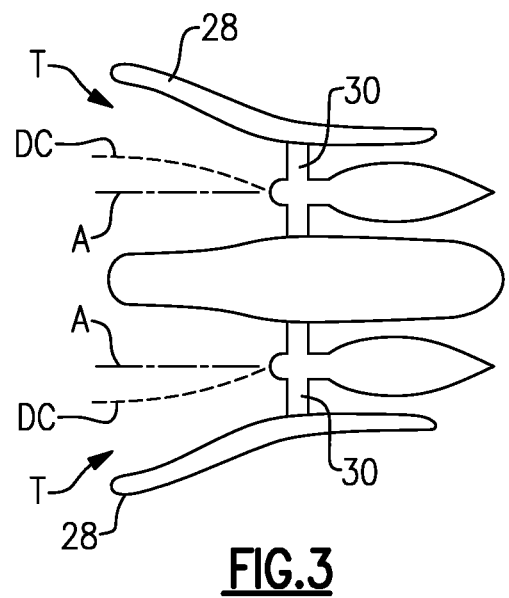
FIG. 3 illustrates a cross-sectional view of the gas turbine engine from FIG. 2.

As shown in FIGS. 3 and 4, the duct centerline DC is spaced from the axis of rotation A at the throat T. The duct centreline DC gradually approaches the axis of rotation A downstream of the throat T. Although a single fan blade is shown in FIGS. 4-7 to illustrate the direction of rotation of the fan 30, one of ordinary skill in the art would recognize that multiple fan blades would surround the fan 30.

As shown in FIG. 5, a first vertical dimension V1 at the throat T of the inlet duct 28 generally increases downstream towards the fan 30 to a second vertical dimension V2 adjacent the fan 30. The second vertical dimension V2 is greater than the first vertical dimension V1.

Figure 8A:
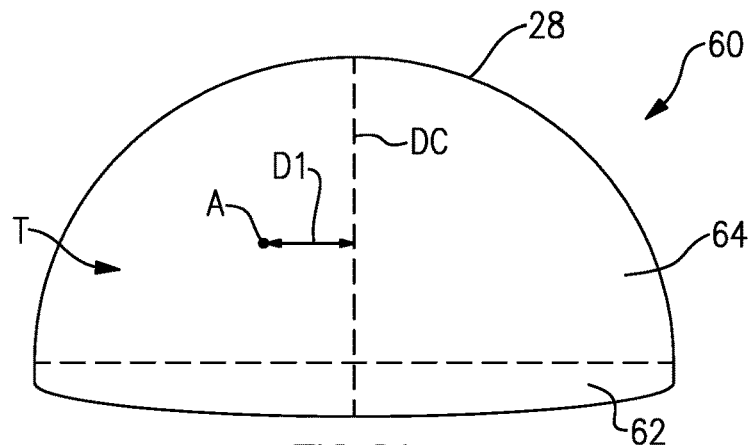
FIG. 8A illustrates the inlet duct at a throat.

As shown in FIG. 8A, the throat T of the inlet duct 28 includes a very small lower ellipse 62 and an upper ellipse 64, which is much larger. This may be at the upstream most point of the inlet duct 28 and immediately downstream of the fuselage 22. The axis of rotation A is spaced horizontally a distance D1 from the duct centerline DC and extends through the inlet duct 28. In this example, the axis of rotation extends through an upper left quadrant of the inlet duct 28.

Figure 8B:
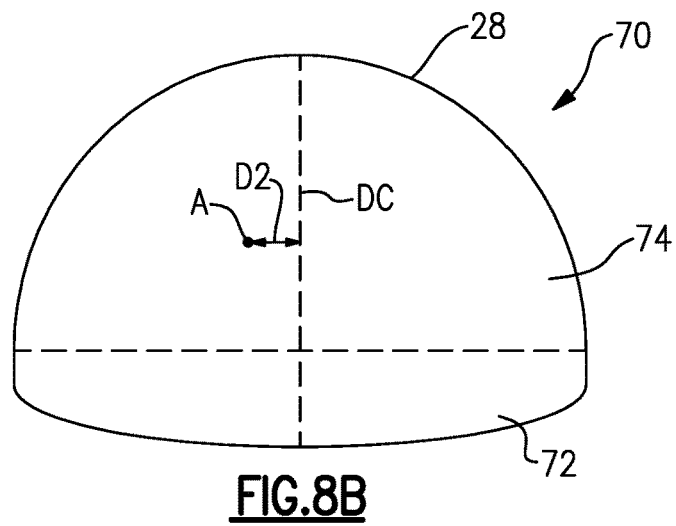
FIG. 8B illustrates the inlet duct at an intermediate location.

FIG. 8B shows another location 70 which is generally intermediate in the inlet duct 28 as shown in FIG. 5. At the location 70, the inlet duct 28 includes a lower ellipse 72 that is much larger than the lower ellipse 62 shown in FIG. 8A. An upper ellipse 74 is slightly narrower than the upper ellipse 64 shown in FIG. 8A. The axis of rotation A is spaced horizontally a distance D2 from the duct centerline DC and extends through an upper left quadrant of the inlet duct 28. The distance D2 is less than the distance D1.

Figure 8C:
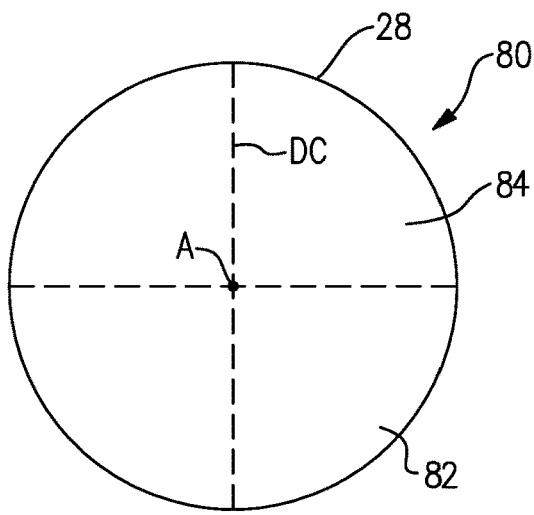
FIG. 8C illustrates the inlet duct adjacent the fan.

FIG. 8C shows a downstream location 80 adjacent the fan 30. An upper ellipse 84 is generally the same size as a lower ellipse 82 and the upper and lower ellipses 84 and 82 are generally circular. The axis of rotation A generally extends through the duct centreline DC or is spaced a distance from the duct centreline DC that is less than the distance D1 or the distance D2 shown in FIGS. 8A and 8B, respectively.

By designing the inlet duct 28 according to the teachings above, the airflow will be more uniform by the time it reaches the fan 30, and the effects of the boundary layer from the fuselage 22 will be dramatically reduced. In particular, air entering the inlet duct 28 along the inlet area IA (FIG. 2) will have a reduced angle of incidence. The inlet area IA is generally located between the 6 and 9 o'clock position when the fan 30 is rotating clockwise and between the 6 and 3 o'clock position when the fan 30 is rotating counterclockwise. Air entering the inlet duct 28 with a high angle of incidence reduces the operational margin of the gas turbine engine 24 and can decrease the life of the fan blades.

A worker of ordinary skill in this art would recognize when either of the inlet shape options would be most efficient to utilize. Of course, other shapes may be utilized as well.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

The invention claimed is:

1. A blended wing aircraft comprising:
a blended wing fuselage and at least one embedded gas turbine engine in the fuselage; and
the gas turbine engine including an inlet duct formed with a generally elliptical shape includes a first set of ellipse sections along an upper portion of the inlet duct and a second set of ellipse sections along a lower portion of the inlet duct, wherein the inlet duct includes a vertical centerline and the first set of ellipse sections at a throat of the inlet duct is larger in area than an area of an upstream most end of the second set of ellipse sections and the area of the second set of ellipse sections increases toward a downstream end of the inlet duct and a fan section having an axis of rotation, wherein the axis of rotation is spaced from the vertical centerline and is disposed within an inlet duct orifice and the inlet duct is upstream of the fan section.

2. The blended wing aircraft of claim 1, wherein the axis of rotation is spaced a first distance from the vertical centerline at the throat of the inlet duct and the axis of rotation is spaced a second distance from the vertical centerline at an intermediate location along the inlet duct, wherein the first distance is greater than the second distance.

3. The blended wing aircraft of claim 2, wherein the axis of rotation is spaced a third distance from the vertical centerline at an axial location adjacent the fan section, the third distance is less than the second distance.

4. The blended wing aircraft of claim 1, wherein the axis of rotation is spaced a first distance from the vertical centerline at a first axial position in the inlet duct and the axis of rotation is spaced a second distance from the vertical centerline at a second axial position in the inlet duct, the first distance is greater than the second distance.

5. The blended wing aircraft of claim 4, wherein the first axial position is upstream of the second axial position.

6. The blended wing aircraft of claim 1, wherein the axis of rotation is spaced from the vertical centerline in a direction of rotation of an upper fan blade of the fan section.

7. The blended wing aircraft of claim 1, wherein the axis of rotation is disposed within an inlet duct orifice.

8. The blended wing aircraft of claim 1, wherein the at least one embedded gas turbine engine includes a first gas turbine engine configured to rotate in a first direction and a second gas turbine engine configured to rotate in a second opposite direction.

9. The blended wing aircraft of claim 1, wherein the vertical centerline follows a curvilinear profile relative to the axis of rotation upstream of the fan section and the axis of rotation intersects an upstream most end of the first set ellipse sections in the upper portion of the inlet duct and spaced from the vertical centerline.

10. The blended wing aircraft of claim 1, wherein the vertical centerline intersects the axis of rotation at a downstream location of the inlet duct adjacent the fan section.

11. The blended wing aircraft of claim 1, wherein the throat of the inlet duct at least partially defines the generally elliptical shape and the vertical centerline extends through the generally elliptical shape at least partially defined by the throat.

12. The blended wing aircraft of claim 1, wherein the fan section is a single fan section and the inlet duct is upstream of the fan section.

13. The blended wing aircraft of claim 1, wherein the throat of the inlet duct includes a first vertical dimension and the inlet duct includes a second vertical dimension downstream of the throat adjacent the fan section and the second vertical dimension is greater than the first vertical dimension.

14. The blended wing aircraft of claim 1, wherein a vertical component of the second set of ellipse sections increases toward the downstream end of the inlet duct and a horizontal component of the second set of ellipse sections decreases toward the downstream end of the inlet duct and the inlet duct includes a circular cross-section immediately upstream of the fan section.

\* \* \* \* \*